United States Patent
Kopetz et al.

(10) Patent No.: US 10,523,760 B2
(45) Date of Patent: Dec. 31, 2019

(54) METHOD AND COMPUTER SYSTEM FOR QUICKLY TRANSMITTING TIME-CONTROLLED REAL-TIME MESSAGES

(71) Applicant: FTS COMPUTERTECHNIK GMBH, Vienna (AT)

(72) Inventors: Hermann Kopetz, Baden (AT); Stefan Poledna, Klosterneuburg (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 0 days.

(21) Appl. No.: 15/768,573

(22) PCT Filed: Oct. 17, 2016

(86) PCT No.: PCT/AT2016/060079
§ 371 (c)(1),
(2) Date: Apr. 16, 2018

(87) PCT Pub. No.: WO2017/063016
PCT Pub. Date: Apr. 20, 2017

(65) Prior Publication Data
US 2018/0295185 A1   Oct. 11, 2018

(30) Foreign Application Priority Data

Oct. 16, 2015  (AT) .............................. A 50882/2015
Oct. 16, 2015  (AT) .............................. A 50886/2015

(51) Int. Cl.
*G06F 15/16* (2006.01)
*H04L 29/08* (2006.01)
*H04L 12/44* (2006.01)

(52) U.S. Cl.
CPC .............. *H04L 67/12* (2013.01); *H04L 12/44* (2013.01)

(58) Field of Classification Search
CPC ... H04L 12/417; H04L 47/826; H04L 47/801; H04L 47/781; H04L 12/911; H04L 12/927
See application file for complete search history.

(56) References Cited

U.S. PATENT DOCUMENTS

| | | |
|---|---|---|
| 2005/0238008 A1 | 10/2005 | Fraser |
| 2010/0183016 A1* | 7/2010 | Bonk .................. G06F 1/14 370/400 |

(Continued)

FOREIGN PATENT DOCUMENTS

| | | |
|---|---|---|
| CN | 103699455 A | 4/2014 |
| EP | 1757036 B1 | 12/2008 |

OTHER PUBLICATIONS

Office Action for Austrian Priority Application No. A 50882/2015, dated Sep. 2, 2016 (3 pages).

(Continued)

*Primary Examiner* — Cheikh T Ndiaye
(74) *Attorney, Agent, or Firm* — Eversheds Sutherland (US) LLP

(57) ABSTRACT

The invention relates to a method, in particular a time controlled error-tolerant method, for periodically transporting real-time data in a computer system, in particular in a distributed computer system, said computer system comprising node computers (111-116), in particular a plurality of node computers (111-116), and distributor units (131, 132, 133, 151), in particular a plurality of distributor units (131, 132, 133, 151). The node computers and the distributor units have access to a global time, and real-time data is transported by means of messages, preferably by means of time-controlled real-time messages. The topology of the computer system corresponds to an intree, and node computers (111-116), are arranged on the leaves of the intree. One or more sensors (101-106) is assigned to each node (Continued)

computer (111-116), and the node computers (111-116) arranged on the leaves of the intree transmit sensor data in the payload of messages in the direction of a control center (100) located at the root of the intree at points in time, preferably at synchronized points in time. The payload of one or more incoming messages in a distributor unit is transported out of the distributor unit with an outgoing message, and an individual time plan is generated a priori for each distributor unit, wherein the time plan contains a periodically repeating starting time (391) for transmitting a message (390) going out of the respective distributor unit, said starting time being calculated a priori from—the a priori known time of arrival of a controlling payload to be transported, which is specified a priori for example, of one of the incoming messages, in particular a time-critical payload to be transported of one of the incoming messages, —minus the a priori known lead-time interval ([391, 393]) of the outgoing message (390), —plus at least one time interval ([393, 393)] required to copy a data element of the controlling payload, in particular the time-critical payload of the incoming message (320), into a data element of the payload of the outgoing message (390); and the payloads of the incoming messages are copied into the payload of the outgoing message by carrying out the a priori generated time plan.

14 Claims, 2 Drawing Sheets

(56) References Cited

U.S. PATENT DOCUMENTS

| | | | |
|---|---|---|---|
| 2013/0121158 A1* | 5/2013 | Balasubramanian | ........................ H04L 12/437 370/241 |
| 2014/0049046 A1* | 2/2014 | Bengtson | ................. G05B 9/03 290/44 |
| 2014/0081473 A1* | 3/2014 | Bengtson | ................. G05B 9/02 700/287 |
| 2015/0012779 A1 | 1/2015 | Poledna | |
| 2016/0294720 A1* | 10/2016 | Varadarajan | ............ H04L 47/60 |
| 2016/0294721 A1* | 10/2016 | Varadarajan | .......... H04L 47/621 |
| 2017/0111293 A1 | 4/2017 | Poledna | |

OTHER PUBLICATIONS

Office Action for Austrian Priority Application No. A 50886/2015, dated Sep. 2, 2016 (3 pages).
Kopetz, H., et al., The Time-Triggered Ethernet (TTE) Design, ISORC'05 Proceedings of the Eighth IEEE International Symposium on Object-Oriented Real-Time Distributed Computing, pp. 22-33, published May 2005 (12 pages).
Network Switch, Wikipedia, last modified on Nov. 30, 2018 (7 pages).
SAE International, Time-Triggered Ethernet, Aerospace Standard AS6802, issued Nov. 2011 (108 pages).
Hermann Kopetz, Real-Time Systems (2nd Ed.), pp. 51-81, Springer Science+Business Media, LLC (2011) (36 pages).
Payload (Disambiguation), Wikipedia, last modified on Feb. 14, 2018 (1 page).
Parent Pointer Tree, Wikipedia, last modified on Nov. 29, 2016 (2 pages).
Kopetz, H., A Conceptual Model for the Information Transfer in Systems-of-Systems, ISORC'14 Proceedings of the 17th IEEE International Symposium on Object/Component/Service-Oriented Real-Time Distributed Computing, published Jun. 2014 (8 pages).

* cited by examiner

METHOD AND COMPUTER SYSTEM FOR QUICKLY TRANSMITTING TIME-CONTROLLED REAL-TIME MESSAGES

The invention relates to a method, in particular a time-controlled error-tolerant method, for periodic transfer of real-time data in a computer system, in particular in a distributed computer system, said computer system comprising node computers, in particular a plurality of node computers and distributor units, in particular a plurality of distributor units, wherein the node computers and the distributor units have access to a global time, and wherein real-time data is transmitted by means of time-controlled real-time messages.

In addition, the invention relates to a computer system, in particular a distributed computer system, for periodic transmission of real-time data, said computer system comprising node computers, in particular a plurality of node computers and distributor units, in particular a plurality of distributor units, wherein the node computers and the distributor units have access to a global time, and wherein real-time data is transmitted by means of time-controlled real-time messages.

This computer system is preferably a distributed real-time computer system.

In addition, the invention relates to a distributor unit for periodic transmission of real-time data in a computer system, in particular in a distributed computer system, said computer system comprising node computers, in particular a plurality of node computers, and distributor units, in particular a plurality of distributor units, wherein the node computers and the distributor units have access to a global time, and wherein real-time data is transmitted by means of messages, preferably by means of time-controlled real-time messages, and wherein the topology of the computer system corresponds to an intree wherein node computers are arranged on the leaves of the intree, such that one or more sensors are assigned to each one of these node computers, and wherein the node computers assigned to the leaves of the intree send sensor data in the payload of messages in the direction of a central control system at the root of the intree at preferably synchronized times.

Periodic processes are implemented in many real-time systems, in particular in the area of control and regulation technology [3]. In a distributed real-time computer system, such a recurring periodic process segment is known as a frame.

In a distributed real-time computer system, a frame begins with synchronized observation of a technical process, for example, by means of spatially distributed sensors, to detect the condition of this technical process at a predetermined point in time.

A node computer is preferably assigned to each sensor, wherein the sensor and the node computer are embodied as separate modules and may be interconnected, or the sensor and the node computer are embodied as one module ("intelligent sensor").

A distributed real-time computer system consists of a plurality of node computers, possibly with connected sensors and actuators that exchange real-time messages over one or more distributor units.

The observation of a technical process can take place in a synchronized manner only if all the node computers which are usually arranged decentrally have access to a global time [5]. For example, the internal clock synchronization contained in the time-controlled TT Ethernet protocol [4] may be used for establishing a global time in all components of a distributed real-time system, in particular a distributed real-time computer system. Since it is possible to synchronize the internal Ethernet time with an external time standard, e.g., GPS, the Ethernet time can also assume the role of synchronization of the sensors if external synchronization is necessary.

The node computers or the intelligent sensors assigned to the sensors and/or arranged in the sensors carry out a first preprocessing of the sensor data and send this preprocessed sensor data, preferably in a periodically recurring time slot, in the form of real-time messages over a real-time communication system to a central control system. Analysis of the sensor data arriving in the central control system makes it possible to detect the current status of the observed technical process and to specify (novel) target values for existing actuators.

In rapid industrial processes, for example, a smart grid [4], sensor data detected simultaneously from a plurality of sensors, which are often hundreds of kilometers away from one another, must be transmitted to the central control system with a latency in the range of milliseconds [5].

The length of the useful data of sensors, i.e., the sensor data, is often short, for example, 2 bytes. If the sensor data is transmitted with a standard protocol such as TT Ethernet [1, 6], then an entire Ethernet message with a minimum length of 64 bytes must be transmitted even for a payload [7] of only 2 bytes. If data of 1000 spatially distributed sensors must be transmitted in 1000 Ethernet messages, then a data volume of 64,000 bytes must be managed for the transmission of 2000 bytes of data payload. In a 100 Mbit Ethernet system, a simple transmission time in the range of milliseconds is needed for transmission of such a data volume in addition to the signal transit time, which depends on distance.

One object of the invention is to enable a comparatively faster transmission.

This object is achieved with a method and a computer system, as mentioned in the introduction, by the fact that the topology of the computer system according to the invention corresponds to an intree, wherein node computers are arranged on the leaves of the intree, one or more sensors are assigned to each one of these nodes, and the node computers located on the leaves of the intree send sensor data in the payload of time-controlled real-time messages in the direction of a central control system located at the root of the intree at times, which are preferably synchronized, and wherein distributor units at internal nodes of the intree, in particular all the distributor units at internal nodes of the intree, which receive real-time messages from a plurality of transmitters, i.e., from at least two node computers or from at least two distributor units or from at least one node computer and at least one distributor unit, copy the payloads of the two or more real-time messages arriving in particular at a time or in a time window defined a priori in the respective distributor unit to the payloads of at least one new real-time message, preferably to the payload of exactly one new real-time message, and wherein this at least one new real-time message, in particular exactly one real-time message, is sent at a time, which is defined a priori, in particular from the distributor units in the direction of the central control system.

In addition, this object can be achieved with a distributor unit which is equipped to implement the measures described above.

This procedure in the distributor units is repeated in the distributor units on the path to the central control system until the sensor data arise in the central control system at a time determined a priori.

Advantageous embodiments of the inventive method and/or computer system which can be implemented either alone or in any combination are listed below:

the node computers, arranged with the distributed sensors in particular, are synchronized with a time supplied by the TT Ethernet protocol;

the real-time messages are transmitted with the TT Ethernet protocol;

in copying the sensor data into a new real-time message, an identifier of this data is also copied to the new real-time message to which the sensor data is also copied;

sensor data from a certain sensor is copied to a certain position in the payload of a new real-time message. With each one of the last two measures, there is assurance that the sensor data can be associated with the correct sensor in a new real-time message, just as before.

In many applications, the network topology corresponds to an intree [8], where the node computers arranged on the leaves of this intree send sensor data from sensors or intelligent sensors at times predetermined a priori, preferably at synchronized times, in the payload of time-controlled real-time messages in the direction of a central system situated at the root of the intree. According to the invention, suitable intelligent distributor units situated on the internal nodes of the intree copy the payloads from a plurality of, i.e., many almost simultaneously arriving sensor messages into the payload of a single new sensor message and send this new sensor message with the expanded payload in the direction of the central control system.

If the maximum payload of a new real-time message is not sufficient for all the real-time messages arriving, then a second new real-time message and, if necessary, a third, fourth, etc., new real-time message is/are generated.

This procedure is repeated in the direction of the central control system until the central control system has been reached.

In a fast industrial process, as many short-term frames as possible must be implemented. The duration of a frame is determined by the sum of the transmission times of the real-time messages, in particular in the periodically recurring time slots, of the network and the processing times of the real-time data in the respective node computers.

The term transmission time of a message is understood to refer to the real-time interval between the start of sending of the message in the sending node computer and the end of receipt of the message in the receiving node computer.

In the interval of time between the start of sending a message from a node computer or a distributor unit and the end of sending of this message, the message is referred to as an outgoing message, based on this node computer or this distributor unit.

In the interval of time between the start of receiving a message at a node computer or a distributor unit and the end of receiving this message, the message is referred to as an incoming message, based on this node computer or this distributor unit.

The term payload of a message is understood to refer to the data payload exchanged between two partners as part of the communication [7].

A real-time message is understood to be a message, which contains real-time data and should arrive at a receiver within a predetermined interval of time (real-time interval).

The transmission time of a message in a distributed real-time computer system is obtained from the sum of the following three durations:

1. The signal transit times through the network and/or computer system. This term is obtained from the sum of the physical transit times of the signals in the network and is determined essentially by the physical length of the transmission channels. A value of 5 μsec/km [5] can be assumed as a guideline value, so that a transmission channel with a total length of 200 meters necessitates a total signal transit time of 1 μsec.

2. The transmission time of a message is obtained from the quotient [message length (in bits))/(bandwidth of the transmission channel (in bit/sec)). A message with a length of 100 bytes, i.e., 800 bits requires a transmission time of 8 μsec in a transmission channel with a bandwidth of 100 Mbit/sec, i.e., Mpbs.

3. The lag times of a message in the distributor units of the network. In a network a distinction is made between two methods of message transmission, namely the store-and-forward method and the cut-through method [3]. In the store-and-forward method, an incoming message is stored as a whole temporarily in a distributor unit before being forwarded by the distributor unit in the direction of its destination. For example, if a 100-byte message is transmitted by a distributor unit in accordance with the store-and-forward method, this yields a lag time of the message of at least 8 μsec in this distributor unit at a bandwidth of 100 MBit/sec. If a message must pass through five distributor units between the transmitting computer node and the receiving computer node, then the sum of the lag times is 40 μ/sec.

The transmission time of a real-time message transmitted through the network according to the store-and-forward method amounts to the values shown in the table for a transmission channel length of 100 m, a transmission channel bandwidth of 100 MBit/sec, a message length of 100 bytes and transmission through five distributor units:

TABLE 1

| Transmission time of a message | |
| --- | --- |
| signal transit time | .5 μsec |
| transmission time | 8 μsec |
| lag time | 40 μsec |
| total | 48.5 μsec |

The signal transit time of a message is determined by the spatial length of the transmission channel, so it cannot be reduced without altering the spatial structure of the network. The transmission time can be reduced if the dynamic data is optimally coded and separated from the static writing [8]. The static writing of data can be associated with the dynamic data transmitted in a message on the basis of the positioning of the dynamic data in the message.

To provide a solution for how to reduce the transmission times of messages, in particular real-time messages, preferably time-controlled messages, in particular time-controlled real-time messages that are sent over a time-controlled computer network consisting of a plurality of linked distributor units, it is also possible to provide that the payload of one or more incoming messages in a distributor unit is transmitted from the distributor unit with an outgoing message, and wherein an individual schedule is prepared for each distributor unit a priori, the schedule containing a periodically recurring starting point of transmission for an outgoing message departing from the respective distributor unit, the message having been calculated a priori from the arrival time, which is known a priori, of a definitive payload, is to be transmitted and is defined a priori, for example, in particular a time-critical payload of one of the incoming messages to be transmitted, minus the lead interval, which is known a priori, of the outgoing message, plus at least one time interval, which is necessary to copy a data element of the determining payload, in particular the time-critical payload of the incoming message, to a data element of the payload of the outgoing message, and wherein the payloads of the incoming messages are copied to the payload of the outgoing message by carrying out this schedule created a priori.

Thus, a method is disclosed, which shows in particular how to significantly reduce the lag times occurring in data transmission in a time-controlled computer network having the structure of an intree, in that the payloads of two or more incoming messages arriving at a distributor unit, preferably incoming at a certain point in time and/or in particular in a certain time slot, are copied into the payload of a new outgoing message according to the individual schedule of the distributor unit described above.

It is thus preferably possible to provide that the schedules are coordinated with one another in the node computers and the distributor units, so that in one distributor unit the receive time (arrival time) of data to be transmitted from an external transmitter (node or external distributor unit) plus the required copy interval and minus the lead interval in the outgoing message yields exactly the point in time when the intended data field of the outgoing message is available for the data in the distributor unit, such that sending of the intended data field of the outgoing message is begun immediately after the end of the copy operation.

The "determining" payload of the incoming messages which is used to determine the starting point of sending an outgoing message, is preferably defined a priori and is preferably contained in a schedule. The determination is preferably based on the chronological position of the payloads to be transmitted in the incoming and outgoing messages as well as the interval of time required to copy the payload of an incoming message to the payload of the corresponding outgoing message.

In the conventional cut-through method [3] according to the state of the art, forwarding of an incoming message in the direction of its destination has already begun before the entire message has arrived in the distributor unit. This is done after evaluation of the first portion of an incoming message, the message header, which contains the attributes of the message such as the type of message, the destination address and the transmitter's address.

In an Austrian patent application by the present applicant [1], which was filed at the same time, the time response of the conventional cut-through method is improved by introducing a time-controlled method. According to this new method, attributes such as the destination address of a time-controlled real-time message, is assigned a priori to the periodic time slot, while the periodic time-controlled message is transmitted via a distributor unit. After the arrival of the start of the incoming message at a time which is known a priori, it is therefore not necessary to wait until it is possible to access the attributes stored in the header of the message, but instead it is possible to begin immediately with the forwarding of the message in the direction of its destination based on the attributes of the message that are saved a priori. The lag time of the message in a distributor unit is largely eliminated with this new method.

In many real-time systems, the network topology corresponds to an intree [7]. The node computers or intelligent sensors arranged on the leaves of this intree send sensor data in the payload of messages, in particular time-controlled real-time messages, in the direction of a central control system located at the root of the intree and the transmissions go at times that are predetermined a priori, preferably at synchronized times.

With the present invention according to claim 1, the time response of the time-controlled transmission of a large number of real-time data detected almost simultaneously is improved, said data being transmitted in accordance with the store-and-forward method by a network having the structure of an intree. To do so, suitably equipped distributor units ("intelligent" distributor units) equipped for this purpose ("intelligent" distributor units) copy the payloads of many sensor messages arriving almost simultaneously into the payloads of the incoming messages at the internal nodes of the intree. This process is repeated in each distributor unit until reaching the central control system.

The refinement of the invention, which is described above and in which an individual schedule is created a priori for each distributor unit, wherein the schedule contains a periodically recurring starting point for transmission for an outgoing message out of the respective distributor unit, reduces even further the lag times of periodic real-time in a network whose structure can be described by an intree.

The period of time required for copying depends on the efficiency and architecture of the distributor unit. The architecture determines how many bits are contained in a data element that can be read in an access operation.

For example, in a 32-bit architecture, 32 bits can be read in one memory access. A state-of-the-art computer needs less than 50 nsec for copying from a data element. This yields a lag time in a distributor unit of less than approx. 200 nsec with a transmission channel having a bandwidth of 100 MBit/sec. If the transmission time from Table 1 of 48.5 μsec is compared with the transmission time of 9.5 μsec that has been reduced on the basis of the present invention, then the significant reduction in the transmission time achieved through this invention is apparent. If in this example the 100 Mbit/sec Ethernet is replaced by a 1000 Mbit/sec Ethernet, then this transmission time is further reduced to 2.5 μsec. With this transmission time it is usually also possible to close circuits with a frequency of far more than 10 kHz over the network.

Thus, a significant reduction in the duration of a frame is obtained in distributed real-time systems. The significant improvement in the control technology associated with this is of great economic importance in fast processes, e.g., in a smart grid.

Advantageous embodiments of the method according to the invention, the inventive distributor unit according to the invention and the computer system according to the invention, which can be implemented alone or in any combination as well as in any combination with the implementation described above, are enumerated below:

the payloads of the incoming messages are copied into predetermined positions in the payload of the outgoing message;

a distributor unit checks on whether, after arrival of the checksum of an incoming message, a data error has occurred in the incoming message, and wherein, in the event of an error, an error message is sent to the central control system;

the—dynamic—data is transmitted in a message and the—static—description of this data is derived from the position of the data in the message;

the messages, in particular real-time messages, are transmitted by the TT Ethernet protocol.

The present invention will now be described in greater detail on the basis of one example as illustrated in the following drawings, in which.

Figure 1:
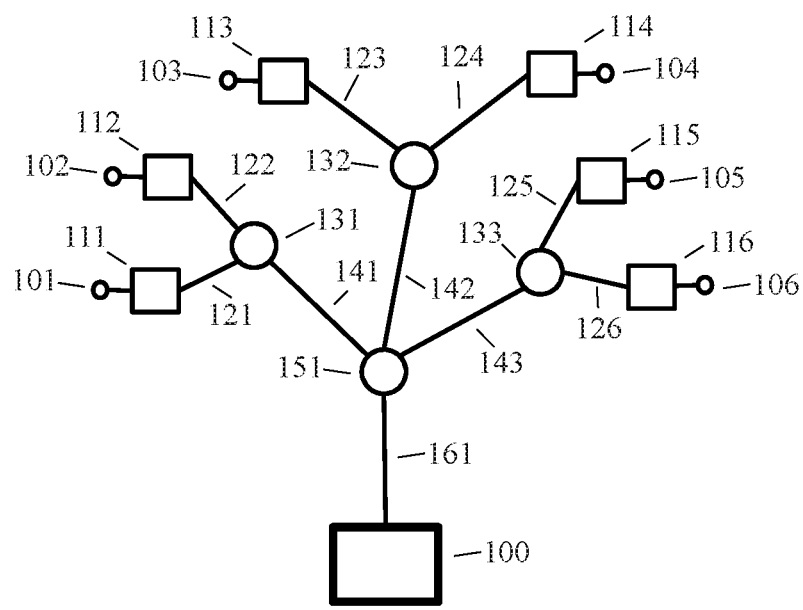
FIG. 1 shows the structure of a simple computer system or computer network.

FIG. 1 represents the topology of a computer system, in particular a distributed real-time system. Sensors with the node computers associated with them and connecting lines from the node computers to the nearest distributor unit are located on the leaves of the intree in FIG. 1. The following are connected:

sensor 101 to the node computer 111 via connecting line 121 to distributor unit 131;
sensor 102 to the node computer 112 via connecting line 122 to distributor unit 131;
sensor 103 to the node computer 113 via connecting line 123 to distributor unit 132;
sensor 104 to the node computer 114 via connecting line 124 to distributor unit 132;
sensor 105 to the node computer 115 via connecting line 125 to distributor unit 133;
sensor 106 to the node computer 116 via connecting line 126 to distributor unit 133.

The distributor unit 131, an internal node of the intree, is connected to a distributor unit 151 via the connecting line 141; likewise the distributor unit 132 is connected via the connecting line 142 and the distributor unit 133 is connected via the connecting line 143. Finally the distributor unit 151 is connected to a central control system 100 at the root of the intree via a connecting line 161.

The node computers 111, 112, 113, 114, 115 and 116 have access to a global time and periodically receive sensor data simultaneously from the respective sensors to detect a consistent image of a distributed process at a periodic time which is predetermined a priori. The sensor data of a sensor is copied from its node computer to a message, in particular a real-time message, for example, to a time-controlled Ethernet message and sent over a dedicated connecting line to the next distributor unit. The message is sent by node computer 111 via connecting line 121 to distributor unit 131;
node computer 112 via connecting line 122 to distributor unit 131;
node computer 113 via connecting line 123 to distributor unit 132;
node computer 114 via connecting line 124 to distributor unit 132;
node computer 115 via connecting line 125 to distributor unit 133;
node computer 116 via connecting line 126 to distributor unit 133.

At a time determined a priori, which is contained in the schedules of the node computers, a distributed industrial process is observed, for example. Next, the data payload, i.e., the sensor data, is packed into real-time messages, e.g., TT Ethernet messages. These messages from the node computers are transmitted in parallel in time to the respective distributor units, where they arrive at times that are defined a priori.

The payloads of the two Ethernet messages received by the node computers 111 and 112 are copied in the distributor unit 131 to a single new Ethernet message, and this new Ethernet message is sent from the distributor unit 131 in the direction of the central control system 100 at the root of the intree. Likewise, the distributor unit 132 copies the payloads of the two Ethernet messages received from the node computers 113 and 114 into a single new Ethernet message and sends this new Ethernet message in the direction of the central control system 100 at the root of the intree. Likewise, the distributor unit 133 copies the payloads of the two Ethernet messages received by the node computers 115 and 116 into a single new Ethernet message and sends this new Ethernet message in the direction of the central control system 100 at the root of the intree.

At another point in time, which is defined a priori in the schedule of the time-controlled communication, the Ethernet messages of the distributor units 131, 132 and 133 transmitted in parallel in time arrive at the distributor unit 151. The payloads of the three Ethernet messages received by the distributor units 131, 132 and 133 are copied to a single new Ethernet message in the distributor unit 151, and this new Ethernet message is sent by the distributor unit 151 over the connecting line 161 to the central control system 100 at the root of the intree.

Figure 2:
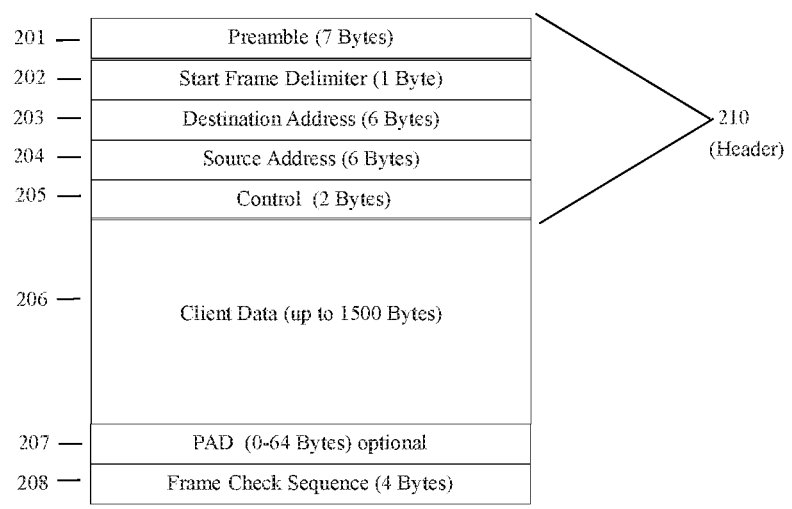
FIG. 2 shows the format of a typical network message.

FIG. 2 shows the format of a typical network message such as that occurring in TT Ethernet [2], for example. The start delimiter 202 follows after the preamble 201, then the destination address 203, the start address 204 and a control field 205, which may indicate the length of the message. The fields 201, 202, 203, 204, 205 are known as the header 210 of the message. Following the header, there is the payload 206 which is the area of data payload. If only a few bytes of data payload are present, then the message with the field 207 is to be stretched to a minimum length. The frame check sequence 208 appears at the end of the message. The fields 103, 104, 105 in FIG. 2 contain the attributes of the message. These attributes are preferably contained in the header 110 of the message.

Figure 3:
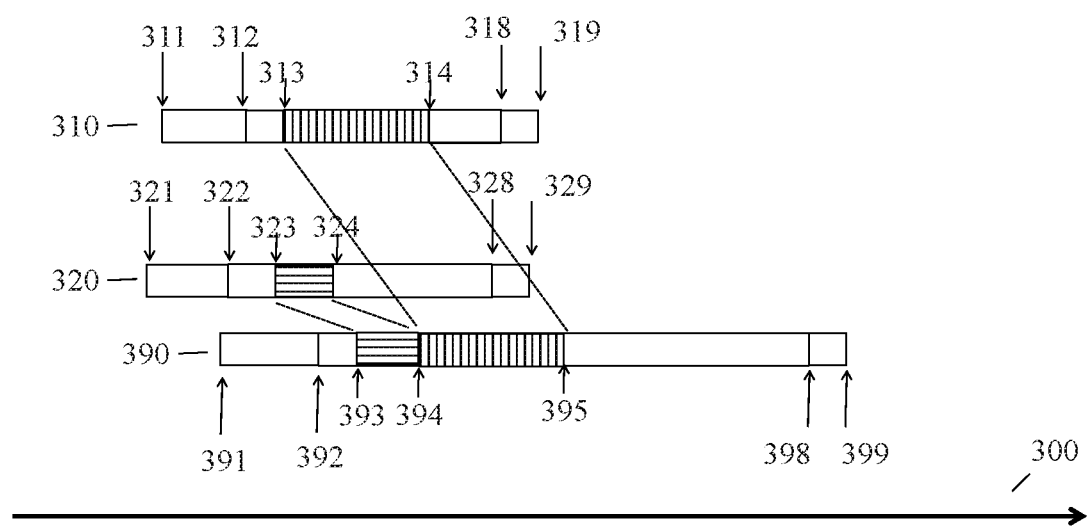
FIG. 3 shows the chronological sequence of the events in a distributor unit.

FIG. 3 shows the chronological sequence of events in a distributor unit. The abscissa 300 shows the progress in the physical time. In this example the incoming messages 310 and 320 arrive in the distributor unit in each periodic time slot [321, 399]. The outgoing message 390 leaves the distributor unit in this time slot [321, 399].

The first bit of the header of the incoming message 320 arrives in the distributor unit at time 321. Time 322 marks the end of the header of the message 320. The payload of the message 320 to be transmitted begins at time 323. The payload of the message 320 to be transmitted ends at time 324. The checksum of the message 320 arrives in the distributor unit in the interval of time [328, 329].

The first bit of the header of the incoming message 310 arrives in the distributor unit at time 311. Time 312 marks the end of the header of the message 310. The payload of the message 310 to be transmitted begins at time 313. The payload of the message 310 to be transmitted ends at time 314. The checksum of the message 310 arrives in the distributor unit in the interval of time [318, 319].

The first bit of the header of the outgoing message 390 leaves the distributor unit at time 391. Time 392 marks the end of the header of the message 390. The first bit of the payload of the message 320 to be transmitted, which was copied to the message 390, leaves the distributor unit at time 393. The first bit of the payload of the message 310 to be transmitted, which was copied to the message 390, leaves the distributor unit at time 394. The last bit of the payload of the message 310 to be transmitted, which was copied to the message 390, leaves the distributor unit at time 395. The checksum of the message 390 leaves the distributor unit in the time interval [398, 399].

We refer to the interval of time [391, 393] between the starting time of the outgoing message 390 and the start of the payload in the outgoing message 390 as the lead interval of the message 390.

The individual schedule created a priori for each distributor unit defines a priori the periodically recurring starting point 391 of sending a time-controlled message 390 departing from a distributor unit. This starting point 391 of the outgoing message 390 is obtained from the difference between the arrival time, which is known a priori, of a certain payload to be transmitted of the incoming messages minus the lead interval [391, 393], also known a priori, of the outgoing message 390 plus at least the interval of time [323, 393] required to copy a data element of the payload of the incoming message 320 to be transmitted to a data element of the payload of the outgoing message 390.

In FIG. 3, the message 320 is used for calculating the starting point of transmission of the message 390, because in this example, it is found from the positions of the payloads in the three messages 310, 320 and 390, which are determined a priori, taking into account the calculation architecture of the distributor unit, that the message 320 conveys the definitive payload.

Within the context of execution of this schedule, which is created a priori, the payloads of the incoming messages 310 and 320 to be transmitted are copied one after the other to predetermined positions in the payloads of the outgoing message 390.

After the time 319, the distributor unit can ascertain, after analysis of the checksum, whether the message 310 has been received without error. If a data error is detected in the message 310 in the context of this analysis of the checksum of the message 310, then an error message is subsequently sent to the central control system 100.

After the time 329, the distributor unit can ascertain, after analysis of the checksum, whether the message 320 has been received successfully. If a data error is detected in the message 320 as part of this analysis of the checksum of the message 320, then an error message is sent subsequently to the central control system 100.

Based on the incoming error messages, the central control system can recognize the respective faulty segments of the payload and take measures to correct these errors, for example, replacing the faulty payload with the payload of the previous period.

LITERATURE CITED

[1] Austrian Patent Application A 50883/2015: Time-controlled cut-through method for data transmission in distributed real-time systems.
[3] Wikipedia, Switch URL: https://de.wikipedia.org/wiki/Switch (network technology)
[4] SAE Standard AS6802 von TT Ethernet. URL: http://standards.sae.org/as6802
[5] Kopetz, H. *Real-time Systems—Design Principles for Distributed Embedded Applications*. Springer Verlag, 2011.
[6] Wikipedia, Payload URL: https://de.wikipedia.org/wiki/Payload
[7] Wikipedia, In-Tree URL: https://de.wikipedia.org/wiki/In-Tree
[8] Kopetz, H. A *Conceptual Model for the Information Transfer in Systems-of-Systems*. Proc. of ISORC 2014, pp. 17-24. IEEE Press.

The invention claimed is:

1. A time-controlled error-tolerant method for periodic transmission of real-time data in a distributed computer system comprising a plurality of node computers (111-116) and a plurality of distributor units (131, 132, 133, 151), wherein the plurality of node computers and the plurality of distributor units have access to a global time, the method comprising:
   transmitting the real-time data by time-controlled real-time messages,
   arranging a topology of the distributed computer system to correspond to an intree, wherein the plurality of node computers (111-116) are arranged on leaves of the intree, wherein one or more sensors (101-106) are associated with each of the plurality of node computers (111-116),
   sending, by the plurality of node computers (111-116) arranged on the leaves of the intree, sensor data in a payload of the time-controlled real-time messages in a direction of a central control system (100) situated at a root of the intree at synchronized points in time,
   copying, by the plurality of distributor units at inner nodes of the intree, which receive the time-controlled real-time messages from a plurality of transmitters, which comprise (i) at least two node computers of the plurality of node computers, (ii) at least two distributor units of the plurality of distributor units, or (iii) at least one node computer of the plurality of node computers and at least one distributor unit of the plurality of distributor units, the payload of the time-controlled real-time messages arriving in the plurality of distributor units at the inner nodes of the intree at a time that is defined a priori or in a time window into a payload of at least one new time-controlled real-time message, and
   sending the at least one new time-controlled real-time message at a time that is defined a priori from the plurality of distributor units in the direction of the central control system (100).

2. The method according to claim 1, wherein the payload of the time-controlled real-time messages arriving in a distributor unit of the plurality of distributor units is transmitted with the at least one new time-controlled real-time message, and wherein an individual schedule, which includes a periodically recurring starting time (391) of a transmission for the at least one new real-time message (390) is created a priori for each distributor unit of the plurality of distributor units, wherein the individual schedule comprises the following algorithm:
   the time, which is known a priori, of an arrival of the payload that is to be transmitted is defined a priori in one of the time-controlled real-time messages, wherein the payload of the time-controlled real-time messages comprises a time-critical payload to be transmitted from one of the time-controlled real-time messages,
   minus a lead interval ([391, 393]), which is known a priori, of the at least one new time-controlled real-time message (390), and
   plus at least one interval of time ([323, 393]), which is necessary to copy a data element of the time-critical payload of the time-controlled real-time message (320)

into a data element of the payload of the at least one new real-time message (390), wherein the payload of the time-controlled real-time messages are copied to the payload of the at least one new real-time message by execution of the individual schedule which is prepared a priori.

3. The method according to claim 1, wherein the payload of the time-controlled real-time messages is copied to a predetermined position of the payload of the at least one new time-controlled real-time message.

4. The method according to claim 3, wherein sensor data is copied from a certain sensor to a certain position in the payload of the at least one new time-controlled real-time message.

5. The method according to claim 1, wherein after arrival of a check sum of the time-controlled real-time messages, the plurality of distributor units are configured to verify whether a data error has occurred in the time-controlled real-time messages, and wherein, if there is the data error, then an error message is sent to the central control system (100).

6. The method according to claim 1, wherein dynamic data is transmitted in the time-controlled real-time messages, and a static description of the dynamic data is derived from a position of the dynamic data in the time-controlled real-time messages.

7. The method according to claim 1, wherein the time-controlled real-time messages are carried out by a TT Ethernet protocol, and/or the plurality of node computers arranged with the one or more sensors are synchronized with a time supplied by the TT Ethernet protocol.

8. The method according to claim 1, wherein in copying the sensor data to the at least one new time-controlled real-time message, an identifier of the sensor data is also copied to the at least one new time-controlled real-time message to which the sensor data is copied.

9. A distributed computer system for periodic transmission of real-time data in the distributed computer system, said distributed computer system comprising:

a plurality of node computers (111-116); and a plurality of distributor units (131, 132, 133, 151), wherein the plurality node computers and the plurality distributor units have access to a global time, and wherein real-time data is transmitted by time-controlled real-time messages, wherein a topology of the distributed computer system corresponds to an intree, wherein the plurality of node computers (111-116) are arranged on the leaves of the intree, wherein one or more sensors (101-106) are associated with each of the plurality of node computers (111-116), and wherein the plurality of node computers (111-116) arranged on the leaves of the intree are configured to send sensor data in a payload of the time-controlled real-time messages in a direction of a central control system (100) situated at a root of the intree at synchronized points in time, wherein the plurality of the distributor units at inner nodes of the intree, which are configured to receive the time-controlled real-time messages from a plurality of transmitters, which comprise (i) at least two node computers of the plurality of node computers, (ii) at least two distributor units of the plurality of distributor units, or (iii) at least one node computer of the plurality of node computers and at least one distributor unit of the plurality of distributor units, are configured to copy the payloads the time-controlled real-time messages, which are arriving in the plurality of distributor unit at a time, which is defined a priori, or in a time window, into a payload of at least one new time-controlled real-time message, and wherein the at least one new time-controlled real-time message is configured to be sent at a time that is defined a priori in the direction of the central control system (100).

10. The distributed computer system according to claim 9, wherein the plurality of node computers are synchronized with a time supplied by a TT Ethernet protocol.

11. The distributed computer system according to claim 10, wherein the time-controlled real-time messages are transmitted by the TT Ethernet protocol.

12. The distributed computer system according to claim 9, wherein in copying the sensor data to the at least one new time-controlled real-time message, an identifier of the sensor data is also copied into the at least one new time-controlled real-time message to which the sensor data is copied.

13. The distributed computer system according to claim 9, wherein the sensor data from a certain sensor is copied to a certain position in the payload of the at least one new time-controlled real-time message.

14. A distributed computer system, wherein one or more of the plurality of distributor units, or all of the plurality of distributor units are configured to carry out the method of claim 1.

* * * * *